(12) United States Patent
Zhou et al.

(10) Patent No.: US 12,183,282 B2
(45) Date of Patent: Dec. 31, 2024

(54) PIXEL DRIVING CIRCUIT OF A DISPLAY PANEL, METHOD FOR DRIVING A DISPLAY PANEL, AND DISPLAY DEVICE

(71) Applicant: HKC CORPORATION LIMITED, Shenzhen (CN)

(72) Inventors: Xiufeng Zhou, Shenzhen (CN); Xin Yuan, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/091,333

(22) Filed: Dec. 29, 2022

(65) Prior Publication Data
US 2023/0386403 A1   Nov. 30, 2023

(30) Foreign Application Priority Data

May 30, 2022   (CN) .......................... 202210602568.5

(51) Int. Cl.
*G09G 3/3233*   (2016.01)

(52) U.S. Cl.
CPC ...................... *G09G 3/3233* (2013.01); *G09G 2300/0452* (2013.01); *G09G 2300/0842* (2013.01);
(Continued)

(58) Field of Classification Search
CPC ......... G09G 3/3233; G09G 2300/0452; G09G 2300/0842; G09G 2310/0297; G09G 2310/08; G09G 2320/0626
See application file for complete search history.

(56) References Cited

U.S. PATENT DOCUMENTS

| 5,408,252 A | 4/1995 | Oki et al. |
| 2007/0001938 A1* | 1/2007 | Lee .......................... G09G 3/325 345/76 |

(Continued)

FOREIGN PATENT DOCUMENTS

| CN | 102044554 A | 5/2011 |
| CN | 103971637 A | 8/2014 |

(Continued)

OTHER PUBLICATIONS

Chinese First Office Action, Chinese Application No. 202210602568.5, mailed Jan. 19, 2023 (17 pages).

(Continued)

*Primary Examiner* — Stacy Khoo (57) ABSTRACT

A pixel driving circuit, a method for driving a display panel, and a display device are provided. The display panel includes pixel columns, each of the pixel columns includes pixel components. The pixel driving circuit includes pixel driving modules, a data line, first gating units, and second gating units. Each of the pixel driving modules is coupled to pixel components of adjacent two pixel columns of the pixel columns, any pixel component in each of the pixel columns is written in a driving voltage via a corresponding driving switch. A terminal of each of the first gating units and a terminal of each of the second gating units are respectively coupled to the data line, another terminal of each of the first gating units is coupled to a corresponding adjacent pixel component, another terminal of each of the second gating units is coupled to another corresponding adjacent pixel component.

9 Claims, 5 Drawing Sheets

(52) U.S. Cl.
CPC . *G09G 2310/0297* (2013.01); *G09G 2310/08* (2013.01); *G09G 2320/0626* (2013.01)

(56) References Cited

U.S. PATENT DOCUMENTS

| | | |
|---|---|---|
| 2007/0212078 A1 | 9/2007 | Jo |
| 2017/0110060 A1* | 4/2017 | Han .................. G09G 3/3225 |
| 2017/0372655 A1 | 12/2017 | Wang et al. |
| 2021/0174747 A1* | 6/2021 | Chen .................. G09G 3/32 |

FOREIGN PATENT DOCUMENTS

| | | |
|---|---|---|
| CN | 104834116 A | 8/2015 |
| CN | 105118425 A | 12/2015 |
| CN | 105118430 A | 12/2015 |
| CN | 105118431 A | 12/2015 |
| CN | 105575330 A | 5/2016 |
| CN | 106847190 A | 6/2017 |
| CN | 109215563 A | 1/2019 |
| CN | 115064105 A | 9/2022 |
| JP | S62218987 A | 9/1987 |

OTHER PUBLICATIONS

International Search Report, International Application No. PCT/CN2022/140770, mailed Feb. 22, 2023 (18 pages).

* cited by examiner

| For a pixel component of each of the pixel columns, writing a first data signal in a control terminal of a driving switch corresponding to the pixel component during a first duration | S1 |

↓

| For another adjacent pixel component arranged in a same row as the pixel component and in another adjacent pixel column, writing a second data signal in a control terminal of another driving switch corresponding to the another adjacent pixel component during a second duration | S2 |

FIG. 7

PIXEL DRIVING CIRCUIT OF A DISPLAY PANEL, METHOD FOR DRIVING A DISPLAY PANEL, AND DISPLAY DEVICE

CROSS REFERENCE TO RELATED APPLICATIONS

The present disclosure claims priority to Chinese Patent Application No. 202210602568.5 filed with China National Intellectual Property Administration on May 30, 2022, the content of which is herein incorporated by reference in its entirety.

TECHNICAL FIELD

The present disclosure relates to a field of display technologies, in particular to a pixel driving circuit of a display panel, a method for driving a display panel, and a display device.

BACKGROUND

In a display panel framework, a data line is coupled to a source pin of a Integrated Circuit (IC), an internal circuit can control to output a corresponding a signal of a grayscale. A scanning line is provided an output signal by a gate on array circuit (GOA) arranged on left side and right side of a horizontal plane of the display panel, and does not need additional IC, thereby saving a cost on the IC of the scanning line. When a resolution of the display panel is high, the number of the data line is large, such that the number of the source pin configured to drive the IC is large, thereby causing high cost on the IC. Therefore, there is many problems.

SUMMARY

In a first aspect, a pixel driving circuit of a display panel is provided in some embodiments of the present disclosure, and the pixel driving circuit includes a plurality of pixel columns, and each of the pixel columns includes a plurality of pixel components, the pixel driving circuit includes: a plurality of pixel driving modules; each of the pixel driving modules is coupled to pixel components of adjacent two pixel columns of the pixel columns, any pixel component in each of the pixel columns is written in a driving voltage via a corresponding driving switch; each of the pixel driving modules includes: a data line, a plurality of first gating units, and a plurality of second gating units; a terminal of each of the first gating units is coupled to the data line, another terminal of each of the first gating units is coupled to a corresponding adjacent pixel component, each of the first gating units is configured to write a first data signal in a control terminal of a driving switch corresponding to the corresponding adjacent pixel component during a first duration, and write a second data signal in the control terminal of the driving switch corresponding to the corresponding adjacent pixel component during a second duration; a terminal of each of the second gating units is coupled to the data line, another terminal of each of the second gating units is coupled to another corresponding adjacent pixel component, each of the second gating units is configured to write the second data signal in a control terminal of another driving switch corresponding to the another corresponding pixel component during the second duration.

In a second aspect, a method for driving a display panel is provided in some embodiments of the present disclosure, the display panel includes a plurality of pixel columns, each of the pixel columns includes a plurality of pixel components, any pixel component in each of the pixel columns is written in a driving voltage via a corresponding driving switch; the method includes: for a pixel component of each of the pixel columns, writing a first data signal in a control terminal of a driving switch corresponding to the pixel component during a first duration; for another adjacent pixel component arranged in a same row as the pixel component and in another adjacent pixel column, writing a second data signal in a control terminal of another driving switch corresponding to the another adjacent pixel component during a second duration.

In a third aspect, a display device is provided in some embodiments of the present disclosure, and includes a panel and the pixel driving circuit mentioned above.

BRIEF DESCRIPTION OF THE DRAWINGS

In order to make the technical solution described in embodiments or background of the present disclosure more clearly, the drawings used for the description of the embodiments or background will be described. Apparently, the drawings in the following description are only some embodiments of the present disclosure. For those skilled in the art, other drawings may be acquired according to the drawings without any creative work.

DETAILED DESCRIPTION

In order to make the technical problem, the technical solution and effect in the present disclosure clear and understandable. The present disclosure is further described in detail below in combination with the drawings and embodiments. It should be understood that the specific embodiments described herein are only used to explain but not to limit the present disclosure.

In order to make purposes, technical solutions and effects of the present disclosure clearer and more understandable, the following is a further detailed description of the present disclosure in conjunction with the drawings and embodiments. It should be understood that embodiments described herein are intended only to explain the present disclosure and are not intended to limit the present disclosure.

In addition, the terms "first" and "second" are used for descriptive purposes only and are not to be construed as indicating or implying relative importance or implicitly specifying the number of technical features indicated. Thus, the features qualified with "first" and "second" may explicitly or implicitly include one or more such features. In the description of the present disclosure, "multiple" means two or more, unless otherwise expressly and specifically limited. It should be noted that the pixel driving circuit of the display panel disclosed in present disclosure can be used in the field of display technology or in any field other than the field of display technology, and the application field of the pixel driving circuit of the display panel disclosed in present disclosure is not limited.

In a display panel framework, a data line is coupled to a source pin of an integrated circuit (IC), and an internal circuit of IC can control to output a signal of a corresponding grayscale. For a Liquid crystal display (LCD), the LCD product can control grayscale by changing a coupling relationship instead of increasing the number of transistor. However, for a organic light-emitting display (OLED) product, the OLED product can not control the grayscale of a display panel by only sharing the data line because of the complicated pixel circuit.

The reason is that, for the LCD product, the LCD product can be driven by a pixel, the pixel is made of luminescent material and can generate white light, the white light can penetrate color film with red, green, and blue and then become red light, green light, and blue light. For the OLED product, Pixel components of the OLED product can be classified as a red pixel component, a green pixel component, and a blue pixel component, and the red pixel component can generate red light through electrically driven, the green pixel component can generate green light through electrically driven, the blue pixel component can generate blue light through electrically driven. Obviously, voltage of pixel components generating red light, green light, and blue light need to be adjust to generating corresponding colors, such that voltage of pixel components is three times that of conventional LCD product. The OLED product can not precisely control the grayscale by only sharing the data line.

It should be understood that the related art can not solve problem in the complicated pixel circuit, and can not provide a method to share the data line when the grayscale need to be controlled precisely. In view of this, a pixel driving circuit of a display panel is provided in the present disclosure. The pixel driving circuit of the display panel includes a pixel driving module including a data line and two gating units, and the two gating units independently write a data voltage in a driving switch. For two pixel columns, in one date line, the two pixel columns may be controlled by value of the data voltage and time of written data voltage. In this way, the grayscale can be adjusted arbitrarily, and the number of data lines can be greatly reduced. The following is a further detailed description of the present disclosure in conjunction with the drawings.

First Embodiment

Figure 1:
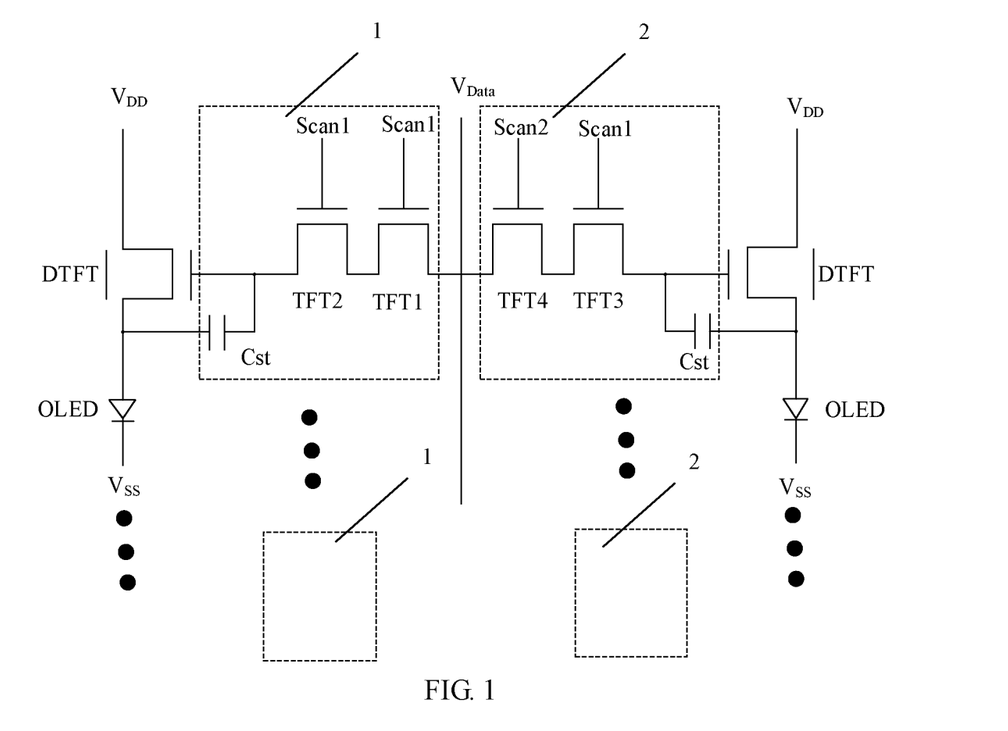
FIG. 1 is a structural schematic diagram of a pixel driving circuit of a display panel according to an embodiment of the present disclosure.

A pixel driving circuit of a display panel is provided in the present disclosure. In the present disclosure, the pixel driving circuit is applied to the display panel (not shown in the drawings). The display panel may include multiple pixel columns, each of the pixel columns may include multiple pixel components OLED (only one pixel component is shown and other pixel components in one pixel column in FIG. 1 are omitted in form of ellipsis). As shown in FIG. 1, the pixel driving circuit may include multiple pixel driving modules, each of the pixel driving modules may be coupled to pixel components OLED of adjacent two pixel columns of the pixel columns, any pixel component OLED in each of the pixel columns is written in a driving voltage via a corresponding driving switch DTFT. Each of the pixel driving modules may include a data line Data, multiple first gating units 1, and a terminal of each of first gating units 1 may be coupled to the data line Data, another terminal of each of first gating units 1 may be coupled to a corresponding adjacent pixel component OLED. Each of the first gating units 1 may be configured to write a first data signal in a control terminal of the driving switch DTFT corresponding to the corresponding pixel component during a first duration. Each of pixel driving modules may include multiple second gating units 2, and a terminal of each of second gating units 2 may be coupled to the data line Data, another terminal of each of the second gating units 2 may be coupled to another corresponding adjacent pixel component OLED, each of the second gating units 2 may be configured to write the second data signal in control terminals of two driving switch DTFT corresponding to corresponding two pixel components OLED during a second duration.

In embodiments of the present disclosure, the pixel components OLED may be organic self-luminescent thin film components, each of the pixel components OLED may be one of red sub-pixel, green sub-pixel, or blue sub-pixel. Specifically, three pixel components OLED may combine and form a integral pixel unit. Color can be adjust by adjusting the driving voltage of the pixel components OLED in the pixel unit.

It should be understood that, in the present disclosure, the pixel unit may be a minimum integrated unit forming a pixel array. The pixel array may form whole display panel (i.e., a panel to be compensated in the present disclosure). That is to say, the pixel array may include multiple pixel units arranged in specific manner, each of pixel units may electrically coupled to a driving IC, and the driving IC may drive the sub-pixels in pixel units to be electrified and emit a color light.

It should be understood that, as mentioned above, each of the pixel units usually includes a blue sub-pixel, a red sub-pixel, and a green sub-pixel. In some embodiments, each of the pixel units may also include other sub-pixels with other color different from red, blue, and green, other color may include white, yellow, or cyan. It is noted that, when the each of the pixel units includes a white sub-pixel, a display brightness of a display device where a pixel array structure is located can be improved. When each of the pixel units includes a sub-pixel with other color, a color gamut of the display device where the pixel array structure is located can be increased, which is not repeated.

In some embodiments of the present disclosure, the pixel driving circuit is applied to the o OLED product. Correspondingly, in some embodiments, the driving switch DTFT may be a Low Temperature Poly-silicon (LTPS) thin film transistor or a Low Temperature Polycrystalline Oxide (LTPO) thin film transistor, which is no limited here.

All switches in the present disclosure may be thin film transistors, specifically, the thin film transistor may be indium gallium zinc oxide (IGZO) thin film transistor, which is not limited here.

In addition, it is noted that term "couple" may indicate electrically coupled directly or indirectly, for example, A is coupled to B may indicate that A is electrically coupled directly to B through wires or wireless signal transmission channels, or A is coupled to B through C, for example, A and B are directly coupled C through wires, or A transmits signals to C, and C transmits the signals to B, such that A is electrically coupled indirectly to B.

Further, in some embodiments of the present disclosure, in different data voltage, the control terminal of the driving switch DTFT (including gate electrode) may control opening degree between an input terminal of the driving switch DTFT and an output terminal of the driving switch DTFT. In the pixel driving circuit, the driving switch DTFT may drive the switch TFT, provide current for the pixel components OLED, and adjust the outputted current, i.e., control a brightness of OLED product. in different data voltage, the control terminal of the driving switch DTFT may control opening degree of the output terminal of the driving switch DTFT.

In addition, it is noted that, in some embodiments of the present disclosure, the pixel units in the display panel may be arranged in an array, and form the unit columns along vertical Y axis direction. Three pixel components OLED (i.e., corresponding sub-pixels) of each of the pixel unit columns may form three "pixel columns". For example, for each of the pixel unit columns, each of the pixel units in the pixel unit column may include a red sub-pixel, a green sub-pixel, and a blue sub-pixel, specifically, each of the pixel unit in the pixel unit columns may include a pixel column of the red sub-pixel, a pixel column of the green sub-pixel, and a pixel column of the blue sub-pixel, and any pixel column may only include a sub-pixel with one color.

Specifically, the pixel components OLED on the pixel column may be written in the driving voltage via the driving switch DTFT. Specifically, a driving voltage terminal $V_{dd}$ may be coupled to each of the pixel components OLED, and a driving switch DTFT may be arranged between the pixel components OLED and the driving voltage terminal $V_{dd}$. A gate electrode of the driving switch DTFT may control conduction degree of a source and a drain. That is, the driving voltage terminal $V_{dd}$ may restrict a voltage inputted to pixel components OLED according to a certain duty ratio. For example, a voltage inputted to the pixel components OLED may be half $V_{dd}$, one third $V_{dd}$ and so on, which is not limited here.

In the present disclosure, each of the first gating units 1 may be configured to write the first data signal in a control terminal of a driving switch DTFT corresponding to each of pixel components OLED of one of pixel columns during a first duration. That is, a value of the first data signal may be used to restrict the driving voltage written in each of pixel components OLED of the one of pixel columns.

Further, each of the second gating units 2 may be configured to write the second data signal in a control terminal of driving a switch DTFT corresponding to each of pixel components OLED of two of pixel columns during a second duration. That is, a value of the second data signal may be used to restrict the driving voltage written in each of the pixel components OLED of two pixel columns.

The following is a further detailed description of the first gating units 1 and the second gating units 2 of the present disclosure. As shown in FIG. 1, the pixel driving circuit may also include multiple first scanning control lines Scan1. The first gating units 1 may include following components.

Each of the first gating units 1 may include a first switch TFT1, a control terminal of the first switch TFT1 may be coupled to a corresponding first scanning control line Scan1, an input terminal of the first switch TFT1 may be coupled to the data line Data, an output terminal of the first switch TFT1 may be coupled to the control terminal of the driving switch DTFT.

Specifically, one of the pixel components OLED in one of the pixel columns is taken as an example. The control terminal of the first switch TFT1 may be coupled to the corresponding first scanning control line Scan1, the output terminal of the first switch TFT1 may be coupled to the control terminal of the driving switch DTFT, thereby writing the data voltage of the date line Date in the control terminal of the driving switch DTFT when the corresponding first scanning control line Scan1 output high level. The higher the data voltage is, the greater the opening degree of the driving switch DTFT is, thereby writing higher voltage in the pixel component OLED. Therefore, in this embodiment, a brightness of any pixel component OLED in the pixel columns can be dynamically adjusted by different data voltage, thereby adjusting the grayscale of the display panel.

Of course, it should be understood that a maximum value of the voltage written in each of the pixel components OLED may be less than or equal to the driving voltage outputted by the driving voltage line $V_{dd}$.

Further, each of the first gating units 1 may include a second switch TFT2 coupled to the first switch TFT1, a control terminal of the second switch TFT2 may be coupled to the corresponding first scanning control line Scan1, an input terminal of the second switch TFT2 may be coupled to the output terminal of the first switch TFT1, an output terminal of the second switch TFT2 may be coupled to the control terminal of the driving switch DTFT.

It can be seen that the second switch TFT2 and the first switch TFT1 may be coupled to each other and connected between the data line Data and the driving switch DTFT in series. Generally speaking, each of the second gating units 2 may include two switches, and two switches may also be arranged in one of the first gating units 1, such that the first gating units 1 and the second gating units 2 may form a symmetric structure. On the other hand, the first gating units 1 and the second gating units 2 may be controlled by same scanning control lines, thereby avoiding a mistake and a confusion. Since the two pixel components OLED may share the same data line Data, data signals need to be written in at different time, such that the data signals may be written in at different time via the first switch TFT1 and the second switch TFT2.

Further, in some embodiments, as shown in FIG. 1, the pixel driving circuit may include multiple second scanning control lines Scan2, and each of the second scanning control linesScan2 may include a third switch TFT 3, a control terminal of the third switch TFT 3 may be coupled to the corresponding first scanning control line Scan1, a input terminal of the third switch TFT 3 may be coupled to the data line Data. Each of the second scanning control lines Scan2 may include a gating switch TFT 4, and a control terminal of the gating switch TFT 4 may be coupled to a corresponding second scanning control line Scan2, an input terminal of the gating switch TFT 4 may be coupled to the output terminal of the third switch TFT 3, an output terminal of the gating switch TFT 4 may be coupled to a control terminal of another driving switch DTFT.

Figure 2:
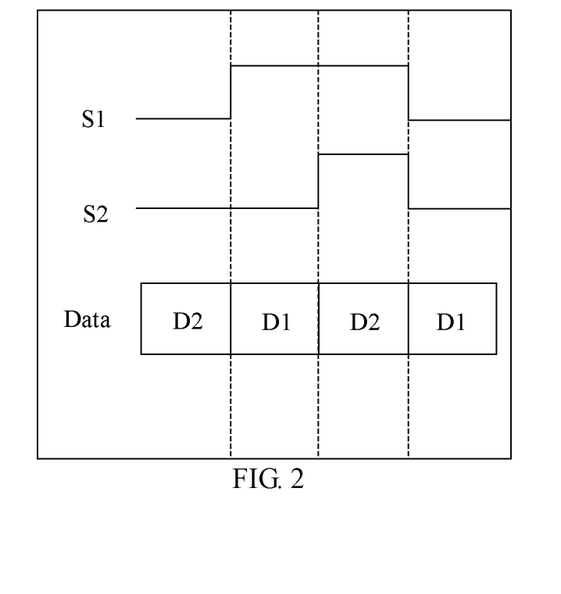
FIG. 2 is a time sequence diagram of the pixel driving circuit in FIG. 1 according to an embodiment of the present disclosure.

Specifically, please refer to a time sequence diagram shown in FIG. 2, during a first timeframe, the first scanning control lines Scan1 may output a low level, the second scanning control lines Scan2 may output a low level, and the data voltage outputted by the data line Data may be D2. Since the first scanning control lines Scan1 outputs the low level, the first switch TFT1 and the second switch TFT2 is closed, and the data voltage D2 outputted by the data line Data can not be written in the control terminal of the driving switch DTFT in left side of FIG. 1, a driving voltage $V_{dd}$ can not be written in the pixel components OLED.

A first duration is a second timeframe in the present disclosure, during the second timeframe, the first scanning control lines Scan1 may output a high level, the second scanning control line Scan2 may output low level, and the data voltage outputted by the data line Data may be D1. Since the first scanning control line Scan1 outputs the high level, the first switch TFT1 and the second switch TFT2 are opened The data voltage D1 outputted by the data line Data can be written in the control terminal of the driving switch DTFT in left side of FIG. 1. In this time, the voltage written in the pixel is less than or equal to the driving voltage $V_{dd}$. Since the control terminal of the gating switch TFT 4 is coupled to the second scanning control lines Scan2, the gating switch TFT 4 is closed, such that the data voltage D1 outputted by the data line Data can not be written in the control terminal of the another driving switch DTFT in right side of FIG. 1. In this way, the another driving switch DTFT in right of FIG. 1 can not be conducted and the driving voltage $V_{dd}$ can not be written in the pixel component OLED in right side of FIG. 1. during this duration, the brightness of the pixel component OLED in left side of FIG. 1 is controlled by setting different data voltage D1.

A third timeframe is a second duration in the present disclosure, during the third timeframe, the first scanning control lines Scan1 may output a high level, the second scanning control line Scan2 may output a high level, and the data voltage outputted by the data line Data may be D2. Since the first scanning control line Scan1 outputs high level, the first switch TFT1 and the second switch TFT2 are opened. The data voltage D2 outputted by the data line Data can be written in the control terminal of the driving switch DTFT in left side of FIG. 1. During this duration, the voltage written in the pixel component OLED is less than or equal to the driving voltage $V_{dd}$. Since the control terminal of the gating switch TFT 4 is coupled to the second scanning control line Scan2, the gating switch TFT 4 is opened, such that the data voltage D2 outputted by the data line Data can be written in the another control terminal of the driving switch DTFT in right side of FIG. 1, then the driving switch DTFT in right of FIG. 1 can be conducted and the driving voltage $V_{dd}$ can be written in the pixel component OLED in right side of FIG. 1. During this duration, the brightness of the pixel components OLED in left and right sides of FIG. 1 are controlled by setting different data voltage D2.

During a fourth timeframe, the first scanning control lines Scan1 and the second scanning control lines Scan2 may output a low level. During this duration, the driving voltage $V_{dd}$ can not be written in the pixel components OLED in left and right sides of FIG. 1.

Further, in some embodiments, each of the first gating units 1 or each of the second gating units 2 may include a capacitor Cst, a terminal of the capacitor Cst may be coupled to a control terminal of the corresponding driving switch DTFT, another terminal of the capacitor Cst may be coupled between a pixel component OLED and the output terminal of the corresponding driving switch DTFT.

Specifically, the capacitor Cst may store the data voltage, in response to the data voltage being written in the control terminal of the driving switch DTFT, the capacitor Cst is charged. In response to the first scanning control lines Scan1 and the second scanning control lines Scan2 outputting the low level, the data voltage is stopped being written in the control terminal of the driving switch DTFT, the capacitor Cst is discharged to hold a voltage the gate electrode of the driving switch DTFT, thereby continuously providing the pixel components OLED a driving current.

Figure 3:
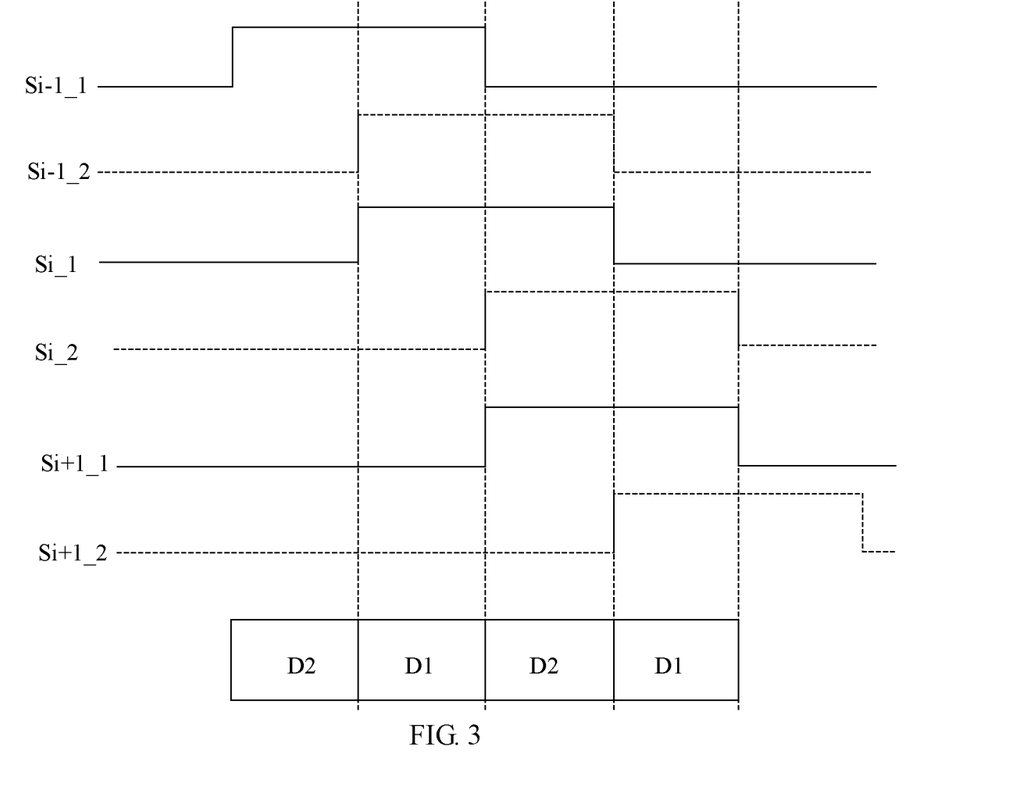
FIG. 3 is a time sequence diagram of a current first scanning control line multiplexing an upper second scanning control line according to an embodiment of the present disclosure.
Figure 4:
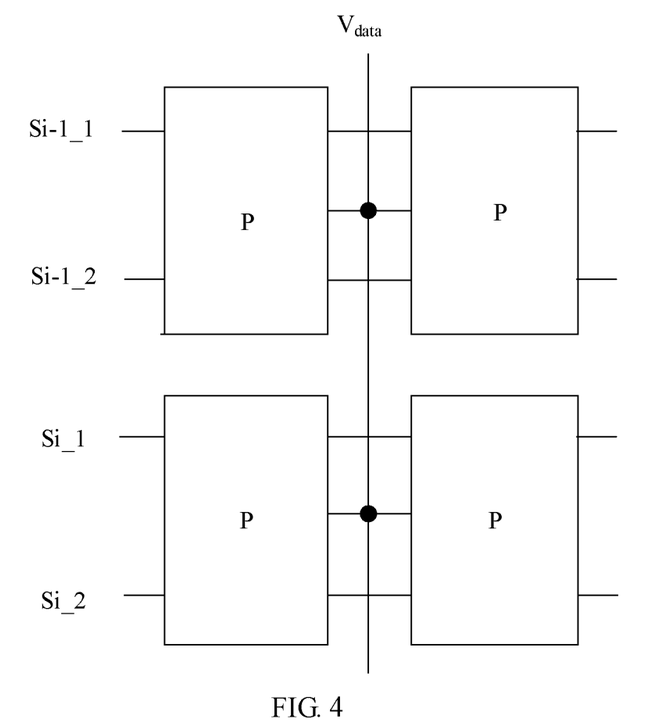
FIG. 4 is a circuit structure diagram of a current first scanning control line not multiplexing an upper second scanning control line according to an embodiment of the present disclosure.
Figure 5:
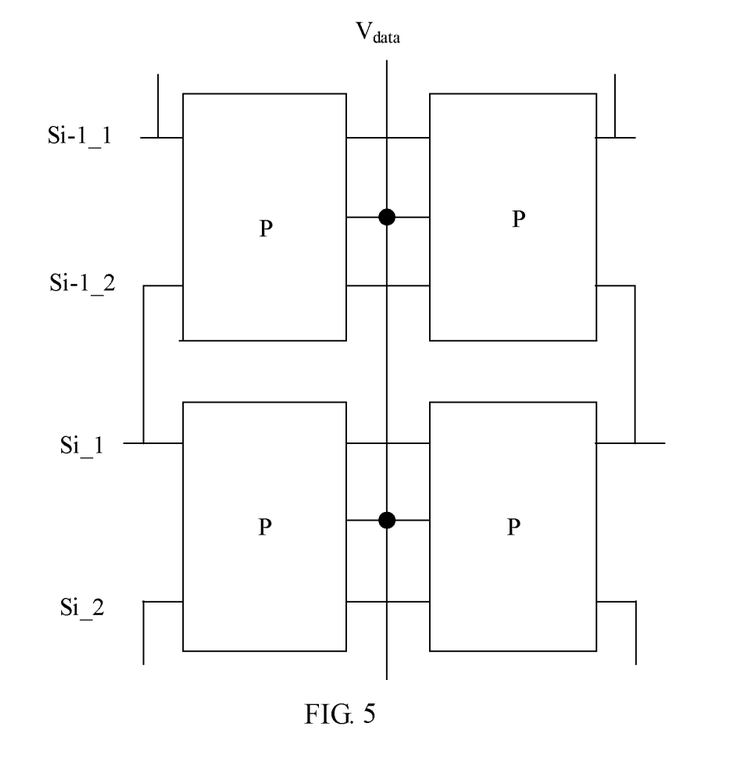
FIG. 5 is a circuit structure diagram of a current first scanning control line multiplexing an upper second scanning control line according to an embodiment of the present disclosure.

Further, as shown in FIG. 3 to FIG. 5, in some embodiments, for an upper pixel component and a lower pixel component adjacent to the upper pixel component in each of the pixel columns, the control terminal of the first switch TFT1, the control terminal of the second switch TFT2, or the control terminal of the third switch TFT3 of the lower pixel component is coupled to the control terminal of the gating switch TFT4 of the upper pixel component, such that the second scanning control lines Scan2 may be multiplexed.

Specifically, as shown in FIG. 4, in response to the second scanning control lines Scan2 not being multiplexed, the upper pixel component and the lower pixel component may control any row of pixel components via the first scanning control lines Scan1 and the second scanning control lines Scan2. As shown in FIG. 5, in response to the second scanning control line Scan2 being multiplexed, the second scanning control lines Scan2 of the upper pixel component may be multiplexed as the first scanning control lines Scan1 of the lower pixel component. Therefore, as shown in FIG. 3, in a time sequence diagram of the first scanning control lines Scan1 and the second scanning control lines Scan2, the first scanning control lines Scan1 and the second scanning control lines Scan2 may respectively occupy two fourth of a period, and a time difference of the first scanning control lines Scan1 and the second scanning control lines Scan2 may be one fourth of the period. Since the second gating units are controlled by the first scanning control lines Scan1 and the second scanning control lines Scan2, the driving switch DTFT can be conducted in response to the first scanning control lines Scan1 and the second scanning control lines Scan2 outputting a high level. Since the driving circuit may scan row by row, a time sequence diagram of an upper first scanning control lines Scan1 is the exactly same as a time sequence diagram of a current first scanning control lines Scan1, such that the upper first scanning control lines Scan1 may be multiplexed as a current first scanning control lines Scan1.

In addition, each of the pixel driving modules may include a diode, a positive electrode of the diode is coupled to an output end of a corresponding driving switch, and a negative electrode of the diode is coupled to a corresponding pixel component. The diode of the present disclosure is configured to avoid a current backflow.

It can be seen that, the pixel driving circuit of the present disclosure may include the pixel driving modules, each of the pixel driving modules may include the data line Data and the two gating units, the two gating units may individually write the data voltage in the driving switch DTFT. In one data line Data, the brightness of the two pixel columns may be controlled by value of the data voltage and time of written data voltage. In this way, the grayscale can be adjusted arbitrarily, and the number of data lines can be greatly reduced.

Second Embodiment

Figure 6:
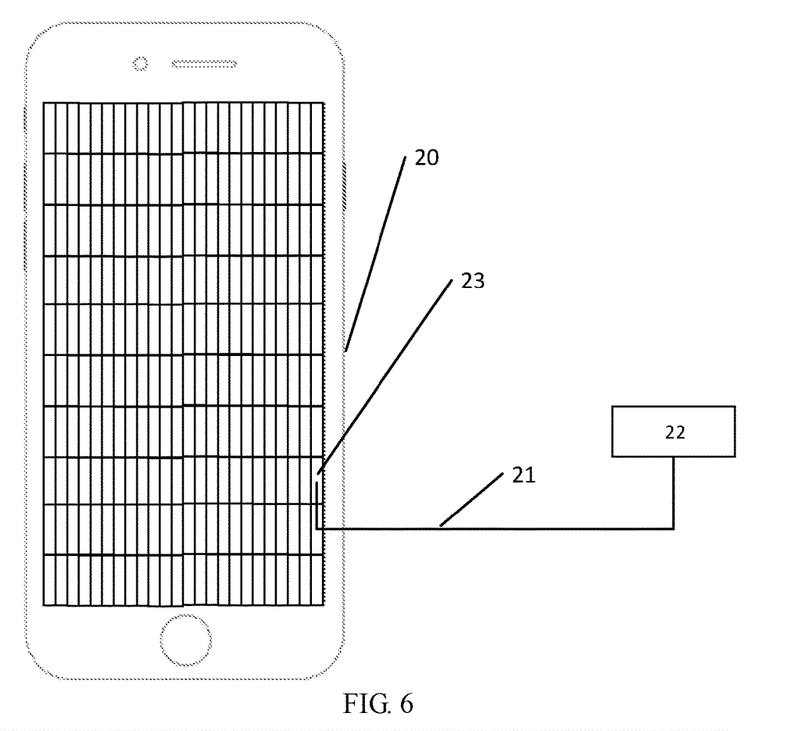
FIG. 6 is a structural schematic diagram of a display device according to an embodiment of the present disclosure.

As shown in FIG. 6, a display device 20 is provided in this embodiment of the present disclosure. The display device 20 may include a pixel driving circuit 22 and the display panel mentioned above. The display panel may include multiple pixel units, each of pixel units may include multiple sub-pixels 23. One column of the sub-units with same color may form one of the pixel columns mentioned above. The pixel driving circuit 22 may be coupled to a control terminal of a driving switch corresponding each of sub-pixels 23 in the display device through wire 21.

Specifically, the display device 20 is provided in this embodiment of the present disclosure may be a mobile phone, a tablet, a television, a monitor, a laptop, a digital photo frame, a navigator or other product or component with display function.

Third Embodiment

Figure 7:
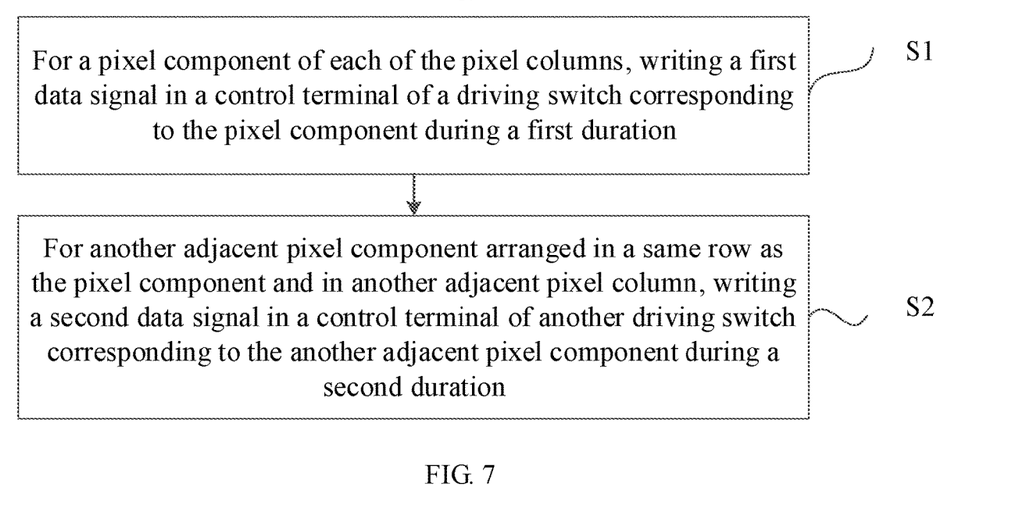
FIG. 7 is a flowchart of a method for driving a display panel according to an embodiment of the present disclosure.

A method for driving a display panel is provided in the present disclosure, the display panel including multiple pixel columns, each of the pixel columns including multiple pixel components, any pixel component in each of the pixel columns being written in a driving voltage via a corresponding driving switch. As shown in FIG. 7, the method may include following operation.

At operation S1, the method may include: for a pixel component of each of the pixel columns, writing a first data signal in a control terminal of a driving switch corresponding to the pixel component during a first duration.

At operation S2, the method may include: for another adjacent pixel component arranged in a same row as the pixel component and in another adjacent pixel column, writing a second data signal in a control terminal of another driving switch corresponding to the another adjacent pixel component during a second duration.

Specifically, as shown in time sequence diagram of FIG. 2, during a first timeframe, the first scanning control lines Scan1 may output a low level, the second scanning control lines Scan2 may output a low level, and the data voltage outputted by the data line Data may be D2. Since the first scanning control lines Scan1 outputs the low level, the first switch TFT1 and the second switch TFT2 is closed, and the data voltage D2 outputted by the data line Data can not be written in the control terminal of the driving switch DTFT in left side of FIG. 1, a driving voltage $V_{dd}$ can not be written in the pixel components OLED.

A first duration is a second timeframe in the present disclosure, during the second timeframe, the first scanning control lines Scan1 may output a high level, the second scanning control line Scan2 may output low level, and the data voltage outputted by the data line Data may be D1. Since the first scanning control line Scan1 outputs the high level, the first switch TFT1 and the second switch TFT2 are opened The data voltage D1 outputted by the data line Data can be written in the control terminal of the driving switch DTFT in left side of FIG. 1. In this time, the voltage written in the pixel is less than or equal to the driving voltage $V_{dd}$. Since the control terminal of the gating switch TFT 4 is coupled to the second scanning control lines Scan2, the gating switch TFT 4 is closed, such that the data voltage D1 outputted by the data line Data can not be written in the control terminal of the another driving switch DTFT in right side of FIG. 1. In this way, the another driving switch DTFT in right of FIG. 1 can not be conducted and the driving voltage $V_{dd}$ can not be written in the pixel component OLED in right side of FIG. 1. during this duration, the brightness of the pixel component OLED in left side of FIG. 1 is controlled by setting different data voltage D1.

A third timeframe is a second duration in the present disclosure, during the third timeframe, the first scanning control lines Scan1 may output a high level, the second scanning control line Scan2 may output a high level, and the data voltage outputted by the data line Data may be D2. Since the first scanning control line Scan1 outputs high level, the first switch TFT1 and the second switch TFT2 are opened. The data voltage D2 outputted by the data line Data can be written in the control terminal of the driving switch DTFT in left side of FIG. 1. During this duration, the voltage written in the pixel component OLED is less than or equal to the driving voltage $V_{dd}$. Since the control terminal of the gating switch TFT 4 is coupled to the second scanning control line Scan2, the gating switch TFT 4 is opened, such that the data voltage D2 outputted by the data line Data can be written in the another control terminal of the driving switch DTFT in right side of FIG. 1, then the driving switch DTFT in right of FIG. 1 can be conducted and the driving voltage $V_{dd}$ can be written in the pixel component OLED in right side of FIG. 1. During this duration, the brightness of the pixel components OLED in left and right sides of FIG. 1 are controlled by setting different data voltage D2.

During a fourth timeframe, the first scanning control lines Scan1 and the second scanning control lines Scan2 may output a low level. During this duration, the driving voltage $V_{dd}$ can not be written in the pixel components OLED in left and right sides of FIG. 1.

It is noted that the display device, the method for driving a display panel, and the pixel driving circuit in embodiments of the present disclosure can be referred with each other, which is not limited. The operation of the method for driving a display panel of the display device in embodiments of the present disclosure may be increased or reduced according to practice application. In the field of the present disclosure, methods that the skilled in the art can easy get are in the scope of the present disclosure.

A pixel driving circuit of a display panel is provided in some embodiments of the present disclosure, and the pixel driving circuit includes a plurality of pixel columns, and each of the pixel columns includes a plurality of pixel components, the pixel driving circuit includes: a plurality of pixel driving modules; each of the pixel driving modules is coupled to pixel components of adjacent two pixel columns of the pixel columns, any pixel component in each of the pixel columns is written in a driving voltage via a corresponding driving switch; each of the pixel driving modules includes: a data line, a plurality of first gating units, and a plurality of second gating units; a terminal of each of the first gating units is coupled to the data line, another terminal of each of the first gating units is coupled to a corresponding adjacent pixel component, each of the first gating units is configured to write a first data signal in a control terminal of a driving switch corresponding to the corresponding adjacent pixel component during a first duration, and write a second data signal in the control terminal of the driving switch corresponding to the corresponding adjacent pixel component during a second duration; a terminal of each of the second gating units is coupled to the data line, another terminal of each of the second gating units is coupled to another corresponding adjacent pixel component, each of the second gating units is configured to write the second data signal in a control terminal of another driving switch corresponding to the another corresponding pixel component during the second duration.

In some embodiments, the pixel driving circuit further comprises a plurality of first scanning control lines, and each of the first gating units comprises: a first switch, wherein a control terminal of the first switch is coupled to a corresponding first scanning control line, an input terminal of the first switch is coupled to the date line, and an output terminal of the first switch is coupled to the control terminal of the driving switch.

In some embodiments, each of the first gating units further comprises: a second switch, coupled to the first switch, wherein a control terminal of the second switch is coupled to the corresponding first scanning control line, an input terminal of the second switch is coupled to the output terminal of the first switch, an output terminal of the second switch is coupled to the control terminal of the driving switch.

In some embodiments, the pixel driving circuit further comprises a plurality of second scanning control lines, and each of the second gating units comprises: a third switch, wherein a control terminal of the third switch is coupled to a corresponding first scanning control line, an input terminal of the third switch is coupled to the data line; a gating switch, wherein a control terminal of the gating switch is coupled to a corresponding second scanning control line, an input terminal of the gating switch is coupled to an output terminal of the third switch, and an output terminal of the gating switch is coupled to the control terminal of the another driving switch.

In some embodiments, each of the first gating units or the second gating units comprises: a capacitor, wherein a terminal of the capacitor is coupled to the control terminal of the corresponding driving switch, another terminal of the capacitor is coupled between a corresponding pixel component and an output terminal of the corresponding driving switch.

In some embodiments, for an upper pixel component and a lower pixel component adjacent to the upper pixel component in each of the pixel columns, the control terminal of the first switch or the control terminal of the second switch of the lower pixel component is coupled to the control terminal of a third switch of the upper pixel component.

In some embodiments, for an upper pixel component and a lower pixel component adjacent to the upper pixel component in each of the pixel columns, the control terminal of the gating switch of the lower pixel component is coupled to the control terminal of the third switch of the upper pixel component.

In some embodiments, each of the pixel driving modules further comprises a diode, a positive electrode of the diode is coupled to an output end of a corresponding driving switch, and a negative electrode of the diode is coupled to a corresponding pixel component.

A method for driving a display panel is provided in some embodiments of the present disclosure, the display panel includes a plurality of pixel columns, each of the pixel columns includes a plurality of pixel components, any pixel component in each of the pixel columns is written in a driving voltage via a corresponding driving switch; the method includes: for a pixel component of each of the pixel columns, writing a first data signal in a control terminal of a driving switch corresponding to the pixel component during a first duration; for another adjacent pixel component arranged in a same row as the pixel component and in another adjacent pixel column, writing a second data signal in a control terminal of another driving switch corresponding to the another adjacent pixel component during a second duration.

A display device is provided in some embodiments of the present disclosure, the display device includes a display panel and the pixel driving circuit mentioned above.

The above-mentioned embodiments are exemplary and should not be construed as limiting the present disclosure. The skilled in the art can change, modify, replace, and deform the embodiments within the scope of the present disclosure.

What is claimed is:

1. A pixel driving circuit of a display panel, the display panel comprising a plurality of pixel columns, and each of the pixel columns comprising a plurality of pixel components, wherein the pixel driving circuit comprises: a plurality of pixel driving modules; wherein each of the pixel driving modules is coupled to pixel components of adjacent two pixel columns of the pixel columns, any pixel component in each of the pixel columns is written in a driving voltage via a corresponding driving switch;

wherein each of the pixel driving modules comprises:
a data line;
a plurality of first gating units, wherein a terminal of each of the first gating units is coupled to the data line, another terminal of each of the first gating units is coupled to a corresponding adjacent pixel component, each of the first gating units is configured to write a first data signal in a control terminal of a driving switch corresponding to the corresponding adjacent pixel component during a first duration, and write a second data signal in the control terminal of the driving switch corresponding to the corresponding adjacent pixel component during a second duration;
a plurality of second gating units, wherein a terminal of each of the second gating units is coupled to the data line, another terminal of each of the second gating units is coupled to another corresponding adjacent pixel component, each of the second gating units is configured to write the second data signal in a control terminal of another driving switch corresponding to the another corresponding pixel component during the second duration;
wherein the pixel driving circuit further comprises a plurality of first scanning control lines, and each of the first gating units comprises:
a first switch, wherein a control terminal of the first switch is coupled to a corresponding first scanning control line, an input terminal of the first switch is coupled to the data line, and an output terminal of the first switch is coupled to the control terminal of the driving switch; and
a second switch, coupled to the first switch, wherein a control terminal of the second switch is coupled to the corresponding first scanning control line, an input terminal of the second switch is coupled to the output terminal of the first switch, an output terminal of the second switch is coupled to the control terminal of the driving switch;
wherein the pixel driving circuit further comprises a plurality of second scanning control lines, and each of the second gating units comprises:
a third switch, wherein a control terminal of the third switch is coupled to the corresponding first scanning control line, an input terminal of the third switch is coupled to the data line; and
a gating switch, wherein a control terminal of the gating switch is coupled to a corresponding second scanning control line different from the first scanning control line, an input terminal of the gating switch is coupled to an output terminal of the third switch, and an output terminal of the gating switch is coupled to the control terminal of the another driving switch;
wherein for an upper pixel component and a lower pixel component adjacent to the upper pixel component and lower than the upper pixel component in a same one of the pixel columns, the control terminal of the gating switch of the lower pixel component is coupled to the control terminal of the third switch of the upper pixel component;

wherein for one of the plurality of first scanning control lines and one of the plurality of second scanning control lines which are configured to control two pixel components of the adjacent two pixel columns arranged in a same row, an end time of an enable period of the first scanning control line is later than a start time of an enable period of the second scanning control line and earlier than an end time of the enable period of the second scanning control line, the enable period of the first scanning control line and the enable period of the second scanning control line have a partially overlapped duration, and the start time of the enable period of the second scanning control line is later than a start time of the enable period of the first scanning control line.

2. The pixel driving circuit as claimed in claim 1, wherein each of the first gating units or the second gating units comprises:

a capacitor, wherein a terminal of the capacitor is coupled to the control terminal of the corresponding driving switch, another terminal of the capacitor is coupled between a corresponding pixel component and an output terminal of the corresponding driving switch.

3. The pixel driving circuit as claimed in claim 1, wherein for the upper pixel component and the lower pixel component adjacent to the upper pixel component and lower than the upper pixel component in a same one of the pixel columns, the control terminal of the first switch or the control terminal of the second switch of the lower pixel component is coupled to the control terminal of the third switch of the upper pixel component.

4. The pixel driving circuit as claimed in claim 1, wherein each of the pixel driving modules further comprises a diode, a positive electrode of the diode is coupled to an output end of a corresponding driving switch, and a negative electrode of the diode is coupled to a corresponding pixel component.

5. A method for driving a display panel, the display panel comprising a plurality of pixel columns, each of the pixel columns comprising a plurality of pixel components, a pixel driving circuit comprising a plurality of pixel driving modules, any pixel component in each of the pixel columns being written in a driving voltage via a corresponding driving switch; wherein the method comprises:

for a pixel component of each of the pixel columns, writing a first data signal in a control terminal of a driving switch corresponding to the pixel component during a first duration;

for another adjacent pixel component arranged in a same row as the pixel component and in another adjacent pixel column, writing a second data signal in a control terminal of another driving switch corresponding to the another adjacent pixel component during a second duration;

wherein each of the pixel driving modules comprises:
a data line;
a plurality of first gating units, wherein a terminal of each of the first gating units is coupled to the data line, another terminal of each of the first gating units is coupled to a corresponding adjacent pixel component, each of the first gating units is configured to write the first data signal in the control terminal of the driving switch corresponding to the corresponding adjacent pixel component during the first duration, and write the second data signal in the control terminal of the driving switch corresponding to the corresponding adjacent pixel component during the second duration; and a plurality of second gating units, wherein a terminal of each of the second gating units is coupled to the data line, another terminal of each of the second gating units is coupled to another corresponding adjacent pixel component, each of the second gating units is configured to write the second data signal in a control terminal of another driving switch corresponding to the another corresponding pixel component during the second duration;

wherein the pixel driving circuit further comprises a plurality of first scanning control lines, and each of the first gating units comprises:

a first switch, wherein a control terminal of the first switch is coupled to a corresponding first scanning control line, an input terminal of the first switch is coupled to the data line, and an output terminal of the first switch is coupled to the control terminal of the driving switch; and a second switch, coupled to the first switch, wherein a control terminal of the second switch is coupled to the corresponding first scanning control line, an input terminal of the second switch is coupled to the output terminal of the first switch, an output terminal of the second switch is coupled to the control terminal of the driving switch;

wherein the pixel driving circuit further comprises a plurality of second scanning control lines, and each of the second gating units comprises:

a third switch, wherein a control terminal of the third switch is coupled to the corresponding first scanning control line, an input terminal of the third switch is coupled to the data line; and a gating switch, wherein a control terminal of the gating switch is coupled to a corresponding second scanning control line different from the first scanning control line, an input terminal of the gating switch is coupled to an output terminal of the third switch, and an output terminal of the gating switch is coupled to the control terminal of the another driving switch;

wherein for an upper pixel component and a lower pixel component adjacent to the upper pixel component and lower than the upper pixel component in a same one of the pixel columns, the control terminal of the gating switch of the lower pixel component is coupled to the control terminal of the third switch of the upper pixel component;

wherein for one of the plurality of first scanning control lines and one of the plurality of second scanning control lines which are configured to control two pixel components of the adjacent two pixel columns arranged in a same row, an end time of an enable period of the first scanning control line is later than a start time of an enable period of the second scanning control line and earlier than an end time of the enable period of the second scanning control line, the enable period of the first scanning control line and the enable period of the second scanning control line have a partially overlapped duration, and the start time of the enable period of the second scanning control line is later than a start time of the enable period of the first scanning control line.

6. A display device, comprising a pixel driving circuit and a display panel, the display panel comprising a plurality of pixel columns, and each of the pixel columns comprising a plurality of pixel components, wherein the pixel driving circuit comprises: a plurality of pixel driving modules; wherein each of the pixel driving modules is coupled to pixel components of adjacent two pixel columns of the pixel columns, any pixel component in each of the pixel columns is written in a driving voltage via a corresponding driving switch;

wherein each of the pixel driving modules comprises:

a data line;

a plurality of first gating units, wherein a terminal of each of the first gating units is coupled to the data line, another terminal of each of the first gating units is coupled to a corresponding adjacent pixel component, each of the first gating units is configured to write a first data signal in a control terminal of a driving switch corresponding to the corresponding adjacent pixel component during a first duration, and write a second data signal in the control terminal of the driving switch corresponding to the corresponding adjacent pixel component during a second duration;

a plurality of second gating units, wherein a terminal of each of the second gating units is coupled to the data line, another terminal of each of the second gating units is coupled to another corresponding adjacent pixel component, each of the second gating units is configured to write the second data signal in a control terminal of another driving switch corresponding to the another corresponding pixel component during the second duration;

wherein the pixel driving circuit further comprises a plurality of first scanning control lines, and each of the first gating units comprises:

a first switch, wherein a control terminal of the first switch is coupled to a corresponding first scanning control line, an input terminal of the first switch is coupled to the data line, and an output terminal of the first switch is coupled to the control terminal of the driving switch; and a second switch, coupled to the first switch, wherein a control terminal of the second switch is coupled to the corresponding first scanning control line, an input terminal of the second switch is coupled to the output terminal of the first switch, an output terminal of the second switch is coupled to the control terminal of the driving switch;

wherein the pixel driving circuit further comprises a plurality of second scanning control lines, and each of the second gating units comprises:

a third switch, wherein a control terminal of the third switch is coupled to the corresponding first scanning control line, an input terminal of the third switch is coupled to the data line; and a gating switch, wherein a control terminal of the gating switch is coupled to a corresponding second scanning control line different from the first scanning control line, an input terminal of the gating switch is coupled to an output terminal of the third switch, and an output terminal of the gating switch is coupled to the control terminal of the another driving switch;

wherein for an upper pixel component and a lower pixel component adjacent to the upper pixel component and lower than the upper pixel component in a same one of the pixel columns, the control terminal of the gating switch of the lower pixel component is coupled to the control terminal of the third switch of the upper pixel component;

wherein for one of the plurality of first scanning control lines and one of the plurality of second scanning control lines which are configured to control two pixel components of the adjacent two pixel columns arranged in a same row, an end time of an enable period of the first scanning control line is later than a start time of an enable period of the second scanning control line and earlier than an end time of the enable period of the second scanning control line, the enable period of the first scanning control line and the enable period of the second scanning control line have a partially overlapped duration, and the start time of the enable period of the second scanning control line is later than a start time of the enable period of the first scanning control line.

7. The display device as claimed in claim 6, wherein each of the first gating units or the second gating units comprises:

a capacitor, wherein a terminal of the capacitor is coupled to the control terminal of the corresponding driving switch, another terminal of the capacitor is coupled between a corresponding pixel component and an output terminal of the corresponding driving switch.

8. The display device as claimed in claim 6, wherein for the upper pixel component and the lower pixel component adjacent to the upper pixel component and lower than the upper pixel component in a same one of the pixel columns, the control terminal of the first switch or the control terminal of the second switch of the lower pixel component is coupled to the control terminal of the third switch of the upper pixel component.

9. The display device as claimed in claim 6, wherein each of the pixel driving modules further comprises a diode, a positive electrode of the diode is coupled to an output end of a corresponding driving switch, and a negative electrode of the diode is coupled to a corresponding pixel component.

* * * * *